US007212887B2

(12) United States Patent
Shah et al.

(10) Patent No.: US 7,212,887 B2
(45) Date of Patent: May 1, 2007

(54) SERVICE AND DIAGNOSTIC TOOL FOR HVAC SYSTEMS

(75) Inventors: Rajendra K. Shah, Indianapolis, IN (US); Chris Puranen, Noblesville, IN (US)

(73) Assignee: Carrier Corporation, Syracuse, NY (US)

( * ) Notice: Subject to any disclaimer, the term of this patent is extended or adjusted under 35 U.S.C. 154(b) by 0 days.

(21) Appl. No.: 10/842,377

(22) Filed: May 10, 2004

(65) Prior Publication Data

US 2005/0159847 A1    Jul. 21, 2005

Related U.S. Application Data

(60) Provisional application No. 60/537,532, filed on Jan. 20, 2004.

(51) Int. Cl.
    *G05D 23/00*    (2006.01)
(52) U.S. Cl. ............... 700/276; 700/277; 236/91 D
(58) Field of Classification Search ............ 236/91 D, 236/91 E, 91 F, 91 R; 700/275, 276, 277, 700/278
    See application file for complete search history.

(56) References Cited

U.S. PATENT DOCUMENTS

| | | | | |
|---|---|---|---|---|
| 5,115,643 A | * | 5/1992 | Hayata et al. ............... 62/115 |
| 5,361,982 A | * | 11/1994 | Liebl et al. ............... 236/46 R |
| 6,179,214 B1 | * | 1/2001 | Key et al. ............... 236/51 |
| 6,535,138 B1 | * | 3/2003 | Dolan et al. ............ 340/815.47 |
| 6,667,690 B2 | * | 12/2003 | Durej et al. ............. 340/572.1 |
| 6,826,454 B2 | * | 11/2004 | Sulfstede ............... 700/276 |
| 2003/0060933 A1 | * | 3/2003 | Sulfstede ............... 700/276 |
| 2004/0111186 A1 | * | 6/2004 | Rossi et al. ............... 700/276 |
| 2004/0204793 A1 | * | 10/2004 | Yoon et al. ............... 700/277 |
| 2004/0236471 A1 | * | 11/2004 | Poth ............... 700/276 |
| 2004/0262410 A1 | * | 12/2004 | Hull ............... 236/91 R |
| 2005/0159924 A1 | * | 7/2005 | Shah et al. ............... 702/183 |

OTHER PUBLICATIONS

PCT International Search Report, dated Apr. 19, 2005.

* cited by examiner

*Primary Examiner*—Albert W. Paladini
*Assistant Examiner*—Douglas S. Lee

(57) ABSTRACT

An HVAC system includes a portable controller unit which communicates with an indoor HVAC component and an outdoor HVAC component over a digital communication bus. A multiple of docking stations each in communication with the data bus are located at a multiple of locations throughout the system such that the portable controller unit may be selectively connected to any of the ports and moved therebetween. By moving the portable controller unit, the technician is then physically present at the HVAC component while exercising the system to obtain additional information and measurements directly from the HVAC component.

26 Claims, 3 Drawing Sheets

SERVICE AND DIAGNOSTIC TOOL FOR HVAC SYSTEMS

The present application claims priority to U.S. Provisional Patent Application Ser. No. 60/537532, filed Jan. 20, 2004. The disclosure of this provisional application is incorporated herein in its entirety, by reference.

BACKGROUND OF THE INVENTION

The present invention relates to an HVAC system, and more particularly to a service and diagnostic tool, which communicates with the entire HVAC system from a multiple of locations.

A heating, ventilating, and air conditioning (HVAC) system includes multiple components that function together in a coordinated manner. Typically, an HVAC system includes an indoor unit such as a gas furnace or fan coil, an outdoor unit such as an A/C or heat pump, and a thermostat. More sophisticated systems might include a multi-zone control capacity with zone control and zone dampers. HVAC systems also frequently include subsystems such as filters, humidifiers, and ventilators.

In conventional residential HVAC systems, minimal information, if any, is provided to the service technician regarding the configuration, operating status, or fault history of the HVAC system. Some of the more advanced components such as variable speed furnaces display fault codes on the individual component equipment display. Some more recent HVAC components also provide the capability for a technician to access more detailed information regarding the component status by connecting a diagnostic tool such as a laptop computer directly thereto. This, of course, requires the technician to transport the service tool to each job site. Also, the information provided by such conventional art components is limited to the single component to which the diagnostic unit is connected and not the entire system.

The technician often must operate the system in its various modes to properly assess system performance and to diagnose any problems. In conventional systems, exercise of this system is accomplished at the thermostat by setting a high heating set point to turn on the furnace or a low cooling set point to turn on the air conditioner. There is no conventional way to directly command a specific stage of heating or cooling, and, in many cases, a technician must wait for the various protection and staging timers to time out before the desired operating mode is activated.

Although effective, conventional service techniques may make the task of the service technician more difficult and time consuming, which may lead to improper installation or incorrect diagnosis. As HVAC systems continue to become more sophisticated, a higher level of training and expertise on the part of the technicians is also required.

Accordingly, it is desirable to provide a diagnostic system within an HVAC system that provides system wide diagnosis and control from a multiple of locations within the HVAC system.

SUMMARY OF THE INVENTION

The HVAC system according to the present invention includes a portable controller unit which communicates with an indoor HVAC component and an outdoor HVAC component over a digital communication bus. A multiple of docking stations, each in communication with the data bus, are located at a multiple of locations throughout the system such that the portable controller unit may be selectively connected to any of the stations and moved therebetween.

The portable controller unit, in addition to conventional thermostat functions, provides a multiple of control and diagnostic pages in a menu driven interface. By moving the portable controller unit, the technician is physically present at the HVAC component while exercising the component to obtain additional information and measurements directly from the HVAC component.

While the system-wide functions may be accomplished by selectively moving the portable controller unit without a separate service tool, the system permits a service tool to be connected to any of the docking stations to which the portable controller unit may be connected for added convenience and flexibility. An additional benefit of this is that the technician need not enter the structure in which the HVAC system is installed.

The present invention therefore provides a diagnostic system within an HVAC system that provides system wide diagnosis and control from a multiple of locations within the HVAC system.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
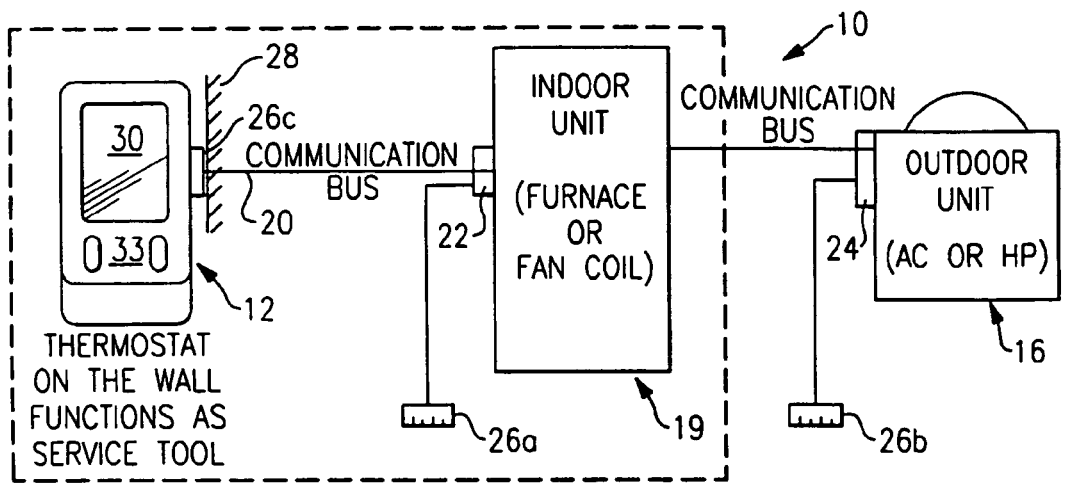
FIG. 1 is a general schematic view of an HVAC system for use with the present invention.

FIG. 1 illustrates a schematic view of an HVAC system 10. The system 10 generally includes a portable controller unit 12 which communicates with an indoor HVAC component 14 and an outdoor HVAC component 16. The components 14, 16 preferably communicate with the portable controller unit 12 over a digital communication bus 20. The bus 20 preferably includes four communication paths such as four paths or the like which communicate data and power. It should be understood that other communication systems can be utilized with the present invention.

The indoor component 14 includes an indoor unit microprocessor controller 22 that communicates with the portable controller unit 12 over the bus 20. The indoor component 14 typically includes a furnace, fan coil, or the like. The outdoor component 16, such as an A/C unit or heat pump, includes an outdoor unit microprocessor controller 24 that communicates with the portable controller unit 12 over the bus 20. That is, each HVAC system component includes a dedicated microprocessor controller 22, 24 that communicates with the portable controller unit 12 over the data bus 20.

It should be understood that although a particular component arrangement and communication bus layout are disclosed in the illustrated embodiment, other arrangements can be utilized with the instant invention.

A multiple of docking stations 26a, 26b each in communication with the data bus 20 are located at a multiple of locations throughout the system 10. Docking station 26*a*, 26*b* are preferably located at each component 14, 16 respectively. Another docking station 26*c* is preferably located at a user accessible docking station location 28, which is typically a location that is readily accessible in the structure conditioned by the system 10. That is, the user accessible docking station location 28 is readily accessible at a typical thermostat location, such as a wall, while the docking stations 26*a*, 26*b* are located adjacent or on the components 14, 16, such that the stations 26*a*, 26*b* may be more likely accessed only by a service technician. Each docking station 26*a*, 26*b*, 26*c* selectively receives the portable controller unit 12 such that the controller communicates with the entire system 10 from any of the stations 26*a*, 26*b*, 26*c*.

The portable controller unit 12 includes a display 30, such as a LCD or flat panel display, and input devices 32, such as a plurality of buttons, directional keypad, but alternatively or additionally include a mouse, keyboard, keypad, remote device or microphone. Alternatively, the display 30 can be a touch screen display.

The portable controller unit 12 preferably operates as a thermostat and diagnostic unit for the HVAC system 10. That is, the portable controller unit 12 typically operates as a thermostat, but provides additional functionality—typically only accessible by a technician—to control, diagnose and exercise the HVAC system 10. The portable controller unit 12 operates as a diagnostic unit for the HVAC system 10 to allow a technician to control various system-wide diagnostic functions from any of the docking station 26*a*, 26*b*, 26*c* locations. That is, the portable controller unit 12 can be selectively moved from one station 26*a*, 26*b*, 26*c* to another.

The portable controller unit 12 includes a computer module 33 connected to the display 30 and input devices 32. The computer module 33 generally includes a CPU 34 and a storage device 36 connected to the CPU 34. The storage device 36 may include a hard drive, CD ROM, DVD, RAM, ROM or other optically readable storage, magnetic storage or integrated circuit. The software to control the HVAC system 10, including the thermostat instructions and the instruction for the display 30 and user interface, may also be stored in storage device 36 or alternatively in ROM, RAM or flash memory.

Figure 2:
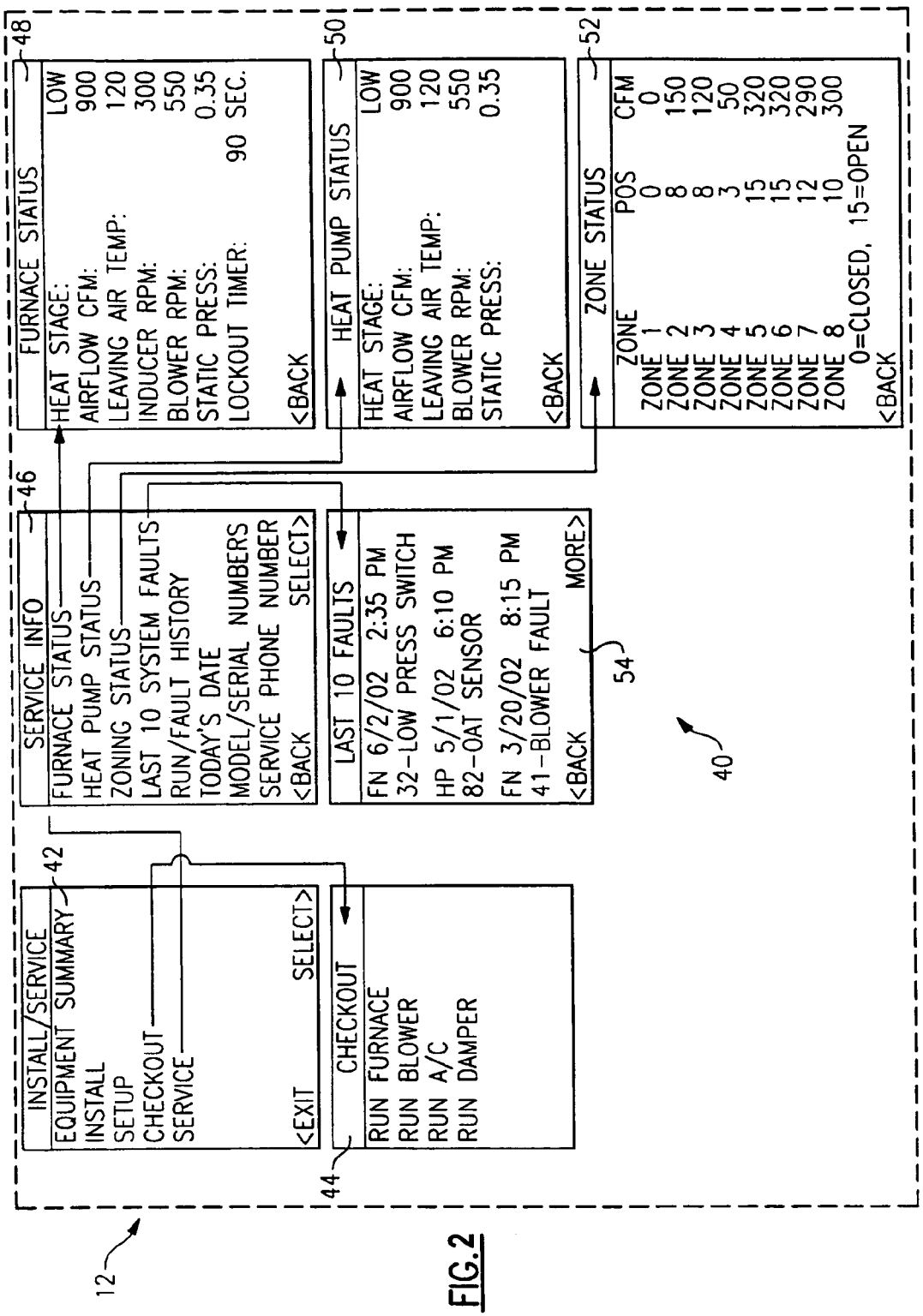
FIG. 2 is a block diagram of one embodiment of a HVAC system.

Referring to FIG. 2, the portable controller unit 12 preferably provides a multiple of control and diagnostic pages in a menu driven interface 40. It should by understand that screens other than those disclosed in the illustrated embodiment can be utilized with the present invention.

One display function is an equipment summary page 42, which lists all installed HVAC components and equipment in the system, along with model and serial numbers. In typical prior art systems, the technician can only obtain such information by physically identifying each piece of equipment and reading its name plate information. Through the menu driven interface 40 selection scheme, the technician can readily access any particular piece of information regarding any unit in the system. It is not necessary for the technician to have a separate service tool device, such as a laptop computer; all the information is available directly out of the system controller unit 12.

The portable controller unit 12 stores long-term operating history including accumulated durations and numbers of cycles of each mode of operation, and a list of all installed equipment, with model numbers, serial numbers and configuration information.

The portable controller unit 12, in its role as a service tool, also has built-in check-out routines. Another display function is a "CHECKOUT" page 44, which enables a technician to selectively exercise all parts of the system in various operating modes. For example, the initial menu shown in the upper left-hand side of FIG. 3 includes a "CHECKOUT" selection. This is included in the control functions such that the technician can operate or exercise the various components in a direct manner. This allows the technician to immediately check the functioning of various components from the location of the portable controller unit 12, and without having to wait for various timers, delays, etc. that would have occurred in the prior art. In the current implementation, check-out procedures are implemented for single and multi-stage furnaces, single and multi-stage air conditioners, heat pumps, zone controls, humidifiers, and ventilators.

A "service" page 46 leads to a multiple of "STATUS" pages 48, 50, 52 which provide status information as an individual HVAC component operates. As the system operates, status information such as heating or cooling stage, air flow, fan motor speed, duct static pressure, sensed temperatures, etc., are displayed so that the technician can properly assess system performance. The service information available to the technician as shown in FIG. 3 includes, but is not limited to: system operating status, number of active heating or cooling stages, indoor blower air flow, outdoor air temperature, outdoor coil temperature, indoor supply air temperature, etc.

Fault messages are also displayed if fault(s) occur anywhere in the system. The technician can set the time duration for which operating continues in any mode. This can allow enough time for the system to stabilize and also for the technician to attach additional instrumentation such as refrigerant pressure gauges to further check system operation. The portable controller unit 12 provides information on active faults anywhere in the system and an ordered record of the most recent system-wide faults with date and time stamps. Further, a long-term fault history page 54 is stored with fault counts by type for each piece of equipment in the system. For further understanding of other aspects of the long-term fault history and associated components thereof, attention is directed to U.S. patent application Ser. No. 10/842,373, entitled ORDERED RECORD OF SYSTEM-WIDE FAULT IN AN HVAC SYSTEM (60,246-335) which is assigned to the assignee of the instant invention and which is hereby incorporated herein in its entirety.

Figure 3:
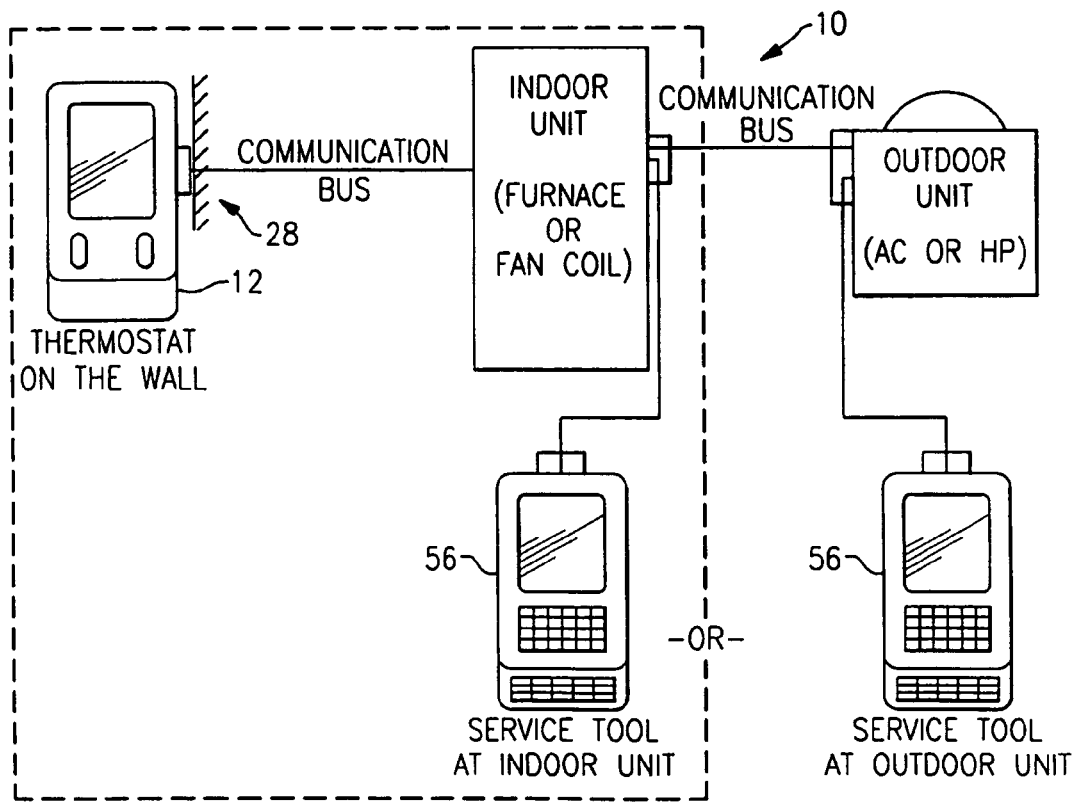
FIG. 3 is a block diagram of another embodiment of a HVAC system.

Referring to FIG. 3, the technician may desire to be physically present at the HVAC component while exercising the component to obtain additional information and measurements directly from the HVAC component. For example, the technician may want to read the pressure gauges attached to the refrigerant lines at an air conditioner or to observe the ignition sequence at a furnace. In order to facilitate this, the portable controller unit 12 may be temporarily removed from its normal wall location 28 and mounted directly to the docking stations 26*a* or 26*b* which are located adjacent to either the components 14, 16. All the system-wide functions described may be conducted with the portable controller unit 12 physically located anywhere in the system.

Figure 4:
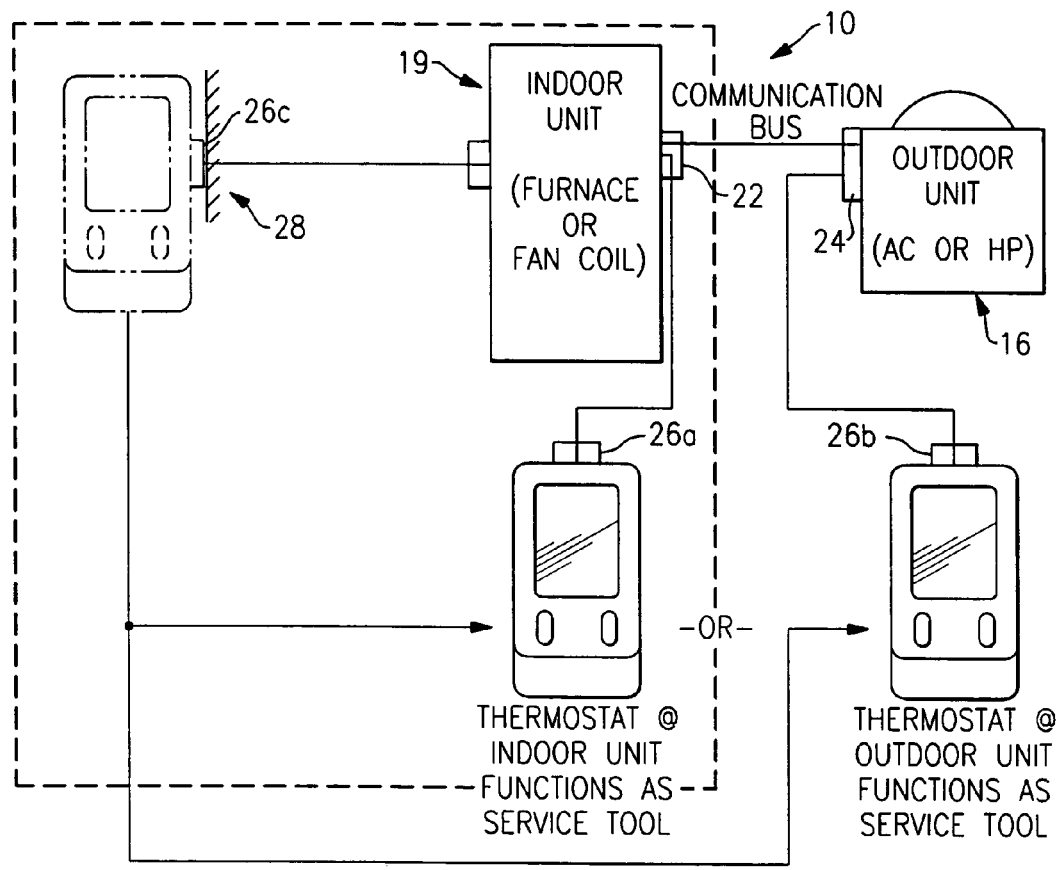
FIG. 4 is a block diagram of another embodiment of a HVAC system.

Referring to FIG. 4, while the system-wide functions may be accomplished by selectively moving the portable controller unit 12 (FIG. 3) without a separate service tool, the system 10 permits a service tool 56 to be connected to the same docking stations 26*a* or 26*b*, 26*c* to which the portable controller unit 12 for added convenience and flexibility. The service tool 56 may be encased in a more rugged manner for service duty.

The service tool 56 preferably includes only diagnostic and exercise function that are utilized by a technician and will co-exist and communicate on the bus 20. The service tool 56 extracts and displays all system information and can temporarily assume control of the HVAC system 10. That is, the service tool 56 overrides some or all commands which the portable controller unit 12 may be sending to the system 10.

Additional benefits of this aspect of the invention are that the technician does not have to remove the portable controller unit 12 from the wall from within the structure in which the HVAC system 10 is installed. Also, the technician can return the service tool 56 to the dealership with system information for further analysis. Another advantage is that the technician may attach the service tool to an outdoor HVAC component (air conditioner or heat pump) and perform all the functions without entering the home.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. An HVAC system comprising:
   a multiple of HVAC components, each of said multiple of HVAC components comprising a component microprocessor;
   a digital communication system in communication with each of said component microprocessors;
   a multiple of docking stations in communication with said digital communication system; and
   a portable controller unit selectively connectable to any of said multiple of docking stations to control said multiple of HVAC components of the HVAC system.

2. The HVAC system as recited in claim 1, wherein said multiple of HVAC components comprise at least one of: an indoor unit, a outdoor unit, a zone control, a furnace or a fan coil.

3. The HVAC system as recited in claim 1, wherein said portable controller unit operates as a thermostat.

4. The HVAC system as recited in claim 3, further comprising a service tool which selectively communicates with said digital communication system through one of said multiple of docking stations.

5. The HVAC system as recited in claim 3, further comprising a service tool which selectively communicates with said digital communication system through one of said multiple of docking stations while said portable controller unit is connected to another of said multiple of docking stations.

6. An HVAC system comprising:
   an indoor HVAC component comprising an indoor component microprocessor;
   an outdoor HVAC component comprising an outdoor component microprocessor;
   a digital communication system in communication with said indoor component microprocessor and said outdoor component microprocessor;
   a docking station in communication with said digital communication system, said indoor HVAC component and said outdoor HVAC component; and
   a portable controller unit selectively connectable to any of said multiple of docking stations to control said indoor and outdoor HVAC component of the HVAC system.

7. The HVAC system as recited in claim 6, wherein said portable controller unit operates as a thermostat.

8. The HVAC system as recited in claim 6, wherein said multiple of docking stations comprise an indoor docking station and an outdoor docking station.

9. A method of communicating with an HVAC system comprising the steps of:
   (1) selectively connecting a portable controller unit to one of a multiple of docking stations, the multiple of docking stations in digital communication with a multiple of HVAC components to control the HVAC system.

10. A method as recited in claim 9, further comprising the step of:
    moving the portable controller unit from one of the multiple of docking stations to another of the multiple of docking stations.

11. A method as recited in claim 9, further comprising the step of:
    connecting a service tool to a second of the multiple of docking stations while the portable controller unit is connected to the one of the multiple of docking stations; and
    overriding all instructions sent by the portable controller unit when the service tool is connected to the one of the multiple of docking stations.

12. A method as recited in claim 11, further comprising the step of:
    overriding an instruction sent by the portable controller unit when the service tool is connected to the second of the multiple of docking stations.

13. A method as recited in claim 9, further comprising the step of:
    (a) utilizing a thermostat as the portable controller;
    (b) removing the thermostat from one of the multiple of docking stations; and
    (c) moving the thermostat to another of the multiple of docking stations.

14. A method of communicating with an HVAC system comprising the steps of:
    (1) operating the HVAC system through a thermostat in digital communication with a multiple of HVAC components;
    (2) removing the thermostat from one of the multiple of docking stations; and
    (3) moving the thermostat to another of the multiple or docking stations.

15. A method as recited in claim 14, further comprising the step of:
    overriding all instructions sent by the thermostat when a service tool is connected to one of the multiple of docking stations while the thermostat is connected to another of the multiple of docking stations.

16. A method as recited in claim 14, wherein said step (3) further comprises the step of:
    (a) exercising at least one of the multiple of HVAC components by controlling the thermostat.

17. A method as recited in claim 16, further comprising the step of:
(b) connecting the thermostat to the one of the multiple of HVAC components being exercised.

18. A method as recited in claim 14, further comprising the step of:
(4) connecting a service tool to the one of the docking stations from which the thermostat was removed in said step (2).

19. A method as recited in claim 14, further comprising the step of:
(4) locating one of the multiple of docking stations on each of a multitude of HVAC components of the HVAC system.

20. The HVAC system as recited in claim 1, wherein said portable controller unit includes a built-in check-out routine which operates to override a timer instruction set of at least one of said multiple of component microprocessor for at least one of said multitude of said HVAC components.

21. The HVAC system as recited in claim 6, wherein said indoor unit is a furnace.

22. The HVAC system as recited in claim 6, wherein said outdoor unit is a heat exchanger.

23. The HVAC system as recited in claim 6, wherein said portable controller unit includes a built-in check-out routine which operates to override a timer instruction of said indoor component microprocessor of said indoor HVAC component.

24. The HVAC system as recited in claim 6, wherein said portable controller unit includes a built-in check-out routine which operates to override a timer instruction of said outdoor component microprocessor of said outdoor HVAC component.

25. A method as recited in claim 9, wherein said step (1) further comprising the steps of:
(a) overriding a timer instruction of at least one of said multiple of HVAC components associated with the one of a multiple of docking stations.

26. A method as recited in claim 14, further comprising the step of:
(4) overriding a timer instruction of the HVAC component associated with the another of the multiple of docking stations of said step (3).

* * * * *

UNITED STATES PATENT AND TRADEMARK OFFICE
CERTIFICATE OF CORRECTION

PATENT NO. : 7,212,887 B2
APPLICATION NO. : 10/842377
DATED : May 1, 2007
INVENTOR(S) : Shah et al.

It is certified that error appears in the above-identified patent and that said Letters Patent is hereby corrected as shown below:

Claim 13, Column 6, line 44: "(b)" should be --(c)--

Claim 13, Column 6, line 46: "(c)" should be --(d)--

Signed and Sealed this

Fourteenth Day of October, 2008

JON W. DUDAS
*Director of the United States Patent and Trademark Office*